United States Patent
Wu

(10) Patent No.: US 12,111,066 B2
(45) Date of Patent: Oct. 8, 2024

(54) METHOD AND DEVICE FOR CONTROLLING COLD STORAGE OF AIR CONDITIONER, AND COMPUTER-READABLE STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventor: Zhiqin Wu, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 337 days.

(21) Appl. No.: 17/641,196

(22) PCT Filed: Oct. 25, 2019

(86) PCT No.: PCT/CN2019/113307
§ 371 (c)(1),
(2) Date: Mar. 8, 2022

(87) PCT Pub. No.: WO2021/046983
PCT Pub. Date: Mar. 18, 2021

(65) Prior Publication Data
US 2022/0341618 A1    Oct. 27, 2022

(30) Foreign Application Priority Data
Sep. 10, 2019  (CN) .......................... 201910858037.0

(51) Int. Cl.
*F24F 11/64*    (2018.01)
*F24F 5/00*    (2006.01)
(Continued)

(52) U.S. Cl.
CPC ............ *F24F 11/64* (2018.01); *F24F 5/0017* (2013.01); *F24F 11/61* (2018.01); *F24F 11/84* (2018.01);
(Continued)

(58) Field of Classification Search
CPC .......... F24F 11/64; F24F 5/0017; F24F 11/61; F24F 11/84; F24F 11/86; F24F 2110/12; F24F 2140/20
(Continued)

(56) References Cited

U.S. PATENT DOCUMENTS 5,623,834 A    4/1997  Bahel et al.
2007/0245768 A1*  10/2007  Sakae ....................... F25B 1/10
                                                                                62/470

(Continued)

FOREIGN PATENT DOCUMENTS

CN    101487616 A    7/2009
CN    101495815 A    7/2009
(Continued)

OTHER PUBLICATIONS

World Intellectual Property Organization (WIPO) International Search Report and Written Opinion for PCT/CN2019/113307 May 25, 2020 14 pages (with translation).
(Continued)

*Primary Examiner* — Jigneshkumar C Patel
(74) *Attorney, Agent, or Firm* — Anova Law Group, PLLC

(57) ABSTRACT

A method for controlling cold storage of an air conditioner includes acquiring an ambient temperature around the air conditioner and a pipe temperature of an exhaust pipe of a compressor of the air conditioner, acquiring a target opening degree corresponding to a current cold storage mode of the air conditioner according to the ambient temperature and the
(Continued)

pipe temperature, and adjusting an opening degree of a throttle device of the air conditioner to be the target opening degree. The throttle device is arranged at a pipe between a cold storage box of the air conditioner and a condenser of the air conditioner.

19 Claims, 2 Drawing Sheets

(51) Int. Cl.
  *F24F 11/61* (2018.01)
  *F24F 11/84* (2018.01)
  *F24F 11/86* (2018.01)
  *F24F 110/12* (2018.01)
  *F24F 140/20* (2018.01)
(52) U.S. Cl.
  CPC ............ *F24F 11/86* (2018.01); *F24F 2110/12* (2018.01); *F24F 2140/20* (2018.01)
(58) Field of Classification Search
  USPC ........................................................ 700/278
  See application file for complete search history.

(56) References Cited

U.S. PATENT DOCUMENTS

| | | | |
|---|---|---|---|
| 2013/0047652 A1* | 2/2013 | Lee | .................. F25D 29/00 |
| | | | 62/228.1 |
| 2017/0176083 A1* | 6/2017 | Sul | .................. F25D 11/006 |
| 2019/0257563 A1 | 8/2019 | Wenming et al. | |
| 2019/0275855 A1* | 9/2019 | Ota | .................. F28D 20/02 |
| 2020/0318882 A1* | 10/2020 | Lee | .................. F25D 17/065 |

FOREIGN PATENT DOCUMENTS

| | | | | |
|---|---|---|---|---|
| CN | 103277876 A | | 9/2013 | |
| CN | 203413748 U | | 1/2014 | |
| CN | 103968497 A | | 8/2014 | |
| CN | 104279657 A | | 1/2015 | |
| CN | 104896683 A | | 9/2015 | |
| CN | 104913415 A | * | 9/2015 | |
| CN | 105423497 A | | 3/2016 | |
| CN | 105571198 A | | 5/2016 | |
| CN | 105890082 A | | 8/2016 | |
| CN | 106440251 A | | 2/2017 | |
| CN | 107238174 A | | 10/2017 | |
| CN | 108954652 A | * | 12/2018 | ............ F24F 11/00 |
| CN | 109140629 A | | 1/2019 | |
| JP | H07329556 A | | 12/1995 | |
| JP | 2002089976 A | | 3/2002 | |
| JP | 2003028517 A | | 1/2003 | |
| JP | 2005241039 A | | 9/2005 | |
| JP | 2006292358 A | | 10/2006 | |
| JP | 2016125729 A | | 7/2016 | |
| JP | 2017036881 A | | 2/2017 | |
| KR | 20030085235 A | | 11/2003 | |
| KR | 20070089507 A | | 8/2007 | |

OTHER PUBLICATIONS

The China National Intellectual Property Administration (CNIPA) The First Office Action for Chinese Application 201910858037.0 Aug. 31, 2021 17 Pages (With Translation).
The China National Intellectual Property Administration (CNIPA) The Notification to Grant Patent Right for Invention for Chinese Application 201910858037.0 Feb. 16, 2022 6 Pages (With Translation).

* cited by examiner

METHOD AND DEVICE FOR CONTROLLING COLD STORAGE OF AIR CONDITIONER, AND COMPUTER-READABLE STORAGE MEDIUM

CROSS-REFERENCE TO RELATED APPLICATIONS

The present application is a National Stage Entry under 35 U.S.C. § 371 of International Application No. PCT/CN2019/113307, filed on Oct. 25, 2019, which claims priority to Chinese Patent Application No. 201910858037.0, filed on Sep. 10, 2019 by GD MIDEA AIR-CONDITIONING EQUIPMENT CO., LTD. and MIDEA GROUP CO., LTD. in China Patent Office, and titled "Method and Device for Controlling Cold Storage of Air Conditioner, and Computer-Readable Storage Medium." The entire contents of both of the aforementioned applications are incorporated herein by reference.

TECHNICAL FIELD

The present application relates to the field of air conditioning, in particular to a method and a device for controlling cold storage of an air conditioner and a computer-readable storage medium.

BACKGROUND

With the improvement of living standards and the development of society, people's demand for refrigeration and air-conditioning has increased sharply. The air conditioners need to consume a lot of electricity. According to the statistical result, the electricity consumption of the air conditioners has accounted for 60% to 70% of the total power consumption of buildings, which has brought great pressure to energy and environment, and the power shortage has limited the development of the air conditioner industry. The cold storage air conditioner stores the cold energy during the period of low electricity price. When the air conditioner needs to be used, the cold storage equipment is used to release the cold energy, which not only saves the electricity cost, but also helps the power department to shift load. Therefore, the application of cold storage air-conditioner in the field of air-conditioning is expanded, which makes the power load shift, reduces the operating cost of the air conditioner, and brings remarkable social and economic benefits to human society.

In the cold storage process of the existing cold storage air conditioner, the inner diameter of the throttle device, such as the capillary tube, of the cold storage air conditioner is constant, that is, the refrigerant flow through the throttle device is constant. The throttle device determines the refrigerant flow, and the refrigerant flow determines the output of the cold energy, that is, determines the efficiency of cold storage. In fact, for different energy efficiencies or cold storage capacities, under different ambient temperatures, the demands for the refrigerant flow of the air conditioner are different. When the compressor discharge temperature is different, the demand for the refrigerant flow of the air conditioner is also different. However, the existing cold storage air conditioner cannot adjust the refrigerant flow during the cold storage process, which leads to low energy efficiency or long cooling time of the air conditioner.

The above content is only set to assist in understanding the technical solution of the present application, and it does not mean that the above content is recognized as prior art.

SUMMARY

The main purpose of the present application is to provide a method and a device for controlling cold storage of an air conditioner and a computer-readable storage medium, aiming at solving the technical problem of low energy efficiency and long cold storing time of the air conditioner due to that the existing air conditioners cannot adjust the refrigerant flow during the cold storage process.

In order to achieve the above purpose, the present application provides a method for controlling cold storage of an air conditioner, which includes a cold storage box, a condenser and a compressor, a throttle device is arranged at a pipe between the cold storage box and the condenser. The method for controlling cold storage of the air conditioner includes:

acquiring an ambient temperature around the air conditioner and a first pipe temperature of an exhaust pipe of the compressor of the air conditioner;

acquiring a target opening degree corresponding to a current cold storage mode of the air conditioner according to the ambient temperature and the first pipe temperature;

adjusting an opening degree of the throttle device to be the target opening degree.

In an embodiment, the acquiring the target opening degree corresponding to the current cold storage mode of the air conditioner according to the ambient temperature and the first pipe temperature includes:

detecting whether there exists a target temperature range matching the ambient temperature in preset temperature ranges of a preset temperature range set;

in response to that the target temperature range exists, acquiring the target opening degree according to the target temperature range and the first pipe temperature.

In an embodiment, the acquiring the target opening degree according to the target temperature range and the first pipe temperature includes:

detecting whether there exists a first target pipe temperature matching the first pipe temperature among a plurality of preset pipe temperatures corresponding to the target temperature range;

in response to that the first target pipe temperature exists, acquiring the target opening degree according to the first target pipe temperature.

In an embodiment, after the detecting whether there exists the first target pipe temperature matching the first pipe temperature among the plurality of preset pipe temperatures corresponding to the target temperature range, the method further includes:

in response to that the first target pipe temperature does not exist and a duration since the first pipe temperature is acquired reaches a first preset duration, acquiring a current second pipe temperature of the exhaust pipe;

acquiring the target opening degree according to the first pipe temperature, the second pipe temperature and the preset pipe temperatures.

In an embodiment, the acquiring the target opening degree according to the first pipe temperature, the second pipe temperature and the preset pipe temperatures includes:

in response to that the second pipe temperature is greater than the first pipe temperature, acquiring first preset temperatures higher than the first pipe temperature among the preset pipe temperatures;

acquiring a second target pipe temperature which is the lowest among the first preset temperatures, and acquiring the target opening degree according to the second target pipe temperature.

In an embodiment, the acquiring the target opening degree according to the first pipe temperature, the second pipe temperature and the preset pipe temperatures includes:

in response to that the second pipe temperature is lower than the first pipe temperature, acquiring second preset temperatures lower than the first pipe temperature among the preset pipe temperatures;

acquiring a third target pipe temperature which is the highest among the second preset temperatures, and acquiring the target opening degree according to the third target pipe temperature.

In an embodiment, before the acquiring the ambient temperature around the air conditioner and the first pipe temperature of the exhaust pipe of the compressor, the method includes:

in response to that a cold storage instruction is detected, starting a cooling fan of the air conditioner;

in response to that the cooling fan is operated for a second preset duration, starting the compressor of the air conditioner.

In an embodiment, the in response to that the cooling fan is operated for a second preset duration, starting the compressor of the air conditioner includes:

in response to that the compressor is a constant frequency compressor, controlling the compressor to operate according to a first preset frequency.

In an embodiment, the in response to that the cooling fan is operated for a second preset duration, starting the compressor of the air conditioner includes:

in response to that the compressor is a variable frequency compressor, controlling the compressor to operate according to a low frequency;

in response to that a duration of the compressor operating at the low frequency reaches a third preset duration, adjusting an operating frequency of the compressor according to a second preset frequency greater than the low frequency.

In an embodiment, the adjusting the operating frequency of the compressor according to the second preset frequency includes:

increasing the operating frequency of the compressor to reach the second preset frequency according to a preset time interval and a preset step size.

In an embodiment, after the starting the compressor of the air conditioner, the method further includes:

in response to that an operating duration of the compressor reaches a fourth preset duration, executing the acquiring the ambient temperature around the air conditioner and the first pipe temperature of the exhaust pipe of the compressor.

In an embodiment, after the adjusting the opening degree of the throttle device to be the target opening degree, the method further includes:

acquiring a cold storage temperature in the cold storage box of the air conditioner, and determining whether the cold storage temperature reaches a third preset temperature;

in response to that the cold storage temperature reaches the third preset temperature, turning off the compressor;

in response to that a duration since the compressor is turned off reaches a fifth preset duration, turning off the cooling fan.

In an embodiment, after the adjusting the opening degree of the throttle device to be the target opening degree, the method further includes:

in response to that a duration since the opening degree of the throttle device is adjusted to be the target opening reaches a sixth preset duration, repeating the acquiring the ambient temperature around the air conditioner and the first pipe temperature of the exhaust pipe of the compressor.

In addition, in order to achieve the above purpose, the present application also provides a device for controlling cold storage of an air conditioner, which includes a memory, a processor and computer-readable instructions stored in the memory and executable by the processor, when the computer-readable instructions are executed by the processor, the aforementioned methods for controlling cold storage of an air conditioner are realized.

In addition, in order to achieve the above purpose, the present application also provides a computer-readable storage medium storing computer-readable instructions, when the computer-readable instructions are executed by the processor, the aforementioned methods for controlling cold storage of an air conditioner are realized.

In the present application, an ambient temperature around the air conditioner and a first pipe temperature of an exhaust pipe of a compressor are acquired, then a target opening degree corresponding to a current cold storage mode of the air conditioner is acquired according to the ambient temperature and the first pipe temperature, and finally an opening degree of a throttle device is adjusted to be the target opening degree. The refrigerant flow adjustment in the cold storage process is realized by adjusting the opening degree of the throttle device according to the cold storage mode, the ambient temperature and the temperature of the exhaust pipe, thereby improving the cold storage capacity of the air conditioner, reducing the cold storing time, and improving the energy efficiency of the air conditioner.

The realization of the purposes, functional features and advantages of the present application will be further explained with reference to the accompanying drawings in combination with the embodiments.

DETAILED DESCRIPTION OF THE EMBODIMENTS

It should be understood that the specific embodiments described herein are intended to be explanatory only and are not intended to limit the present application.

Figure 1:
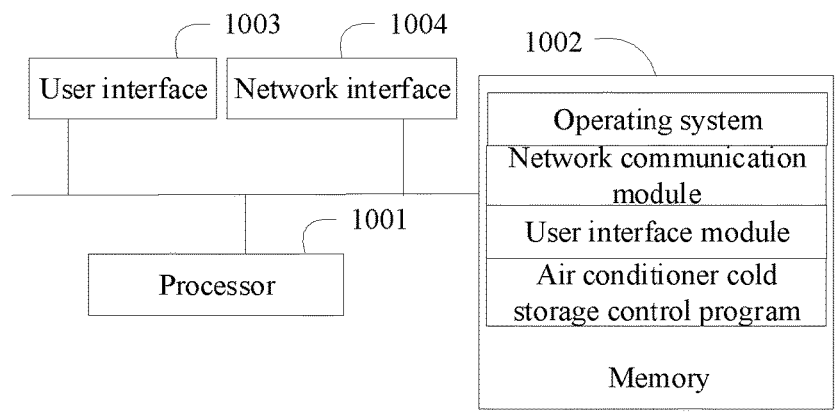
FIG. 1 is a schematic structural diagram of a device for controlling cold storage of an air conditioner in a hardware operating environment according to an embodiment of the present application.

As shown in FIG. 1, FIG. 1 is a schematic structural diagram of a device for controlling cold storage of an air conditioner in a hardware operating environment according to an embodiment of the present application.

As shown in FIG. 1, the device for controlling cold storage of the air conditioner can include a processor 1001, such as a CPU, a network interface 1004, a user interface 1003, a memory 1005 and a communication bus 1002. The communication bus 1002 is used to realize connection and communication between these components. The user interface 1003 may include a display, an input unit such as a keyboard, and the user interface 1003 may optionally also include a standard wired interface and a wireless interface. The network interface 1004 may optionally include a standard wired interface and a wireless interface (such as a WI-FI interface). The memory 1005 can be a high-speed RAM memory or a non-volatile memory such as a disk memory. The memory 1005 may alternatively be a storage device independent of the aforementioned processor 1001.

Optionally, the device for controlling cold storage of the air conditioner can also include RF (Radio Frequency) circuits, sensors, audio circuits, WiFi modules, etc. Of course, the device for controlling cold storage of the air conditioner can also be equipped with other sensors such as a barometer, a hygrometer, a thermometer, an infrared sensor and so on, which will not be described in detail here.

It can be understood by those skilled in the art that the structure of the device for controlling cold storage of the air conditioner shown in FIG. 1 does not constitute a limitation on the device for controlling cold storage of the air conditioner, which may include more or fewer components than shown in the figure, or some components may be combined, or different components may be arranged.

As shown in FIG. 1, the memory 1005, as a computer storage medium, can include an operating system, a network communication module, a user interface module and computer-readable instructions.

In the device for controlling cold storage of the air conditioner shown in FIG. 1, the network interface 1004 is mainly used to connect to a back-end server and communicate with the back-end server. The user interface 1003 is mainly used to connect to a client (client) and communicate with the client. The processor 1001 can be configured to call the computer-readable instructions stored in the memory 1005.

In this embodiment, the device for controlling cold storage of the air conditioner includes a memory 1005, a processor 1001 and computer-readable instructions stored in the memory 1005 and running by the processor 1001, the processor 1001 calls the computer-readable instructions stored in the memory 1005 and performs the following operations:
  acquiring an ambient temperature around the air conditioner and a first pipe temperature of an exhaust pipe of a compressor;
  acquiring a target opening degree corresponding to a current cold storage mode of the air conditioner according to the ambient temperature and the first pipe temperature;
  adjusting an opening degree of a throttle device to be the target opening degree.

Further, the processor 1001 can call the computer-readable instructions stored in the memory 1005 and also perform the following operations:
  detecting whether there exists a target temperature range matching the ambient temperature in preset temperature ranges of a preset temperature range set;
  in response to that the target temperature range exists, acquiring the target opening degree according to the target temperature range and the first pipe temperature.

Further, the processor 1001 can call the computer-readable instructions stored in the memory 1005 and also perform the following operations:
  detecting whether there exists a first target pipe temperature matching the first pipe temperature among a plurality of preset pipe temperatures corresponding to the target temperature range;
  in response to that the first target pipe temperature exists, acquiring the target opening degree according to the first target pipe temperature.

Further, the processor 1001 can call the computer-readable instructions stored in the memory 1005 and also perform the following operations:
  in response to that the first target pipe temperature does not exist and a duration since the first pipe temperature is acquired reaches a first preset duration, acquiring a current second pipe temperature of the exhaust pipe;
  acquiring the target opening degree according to the first pipe temperature, the second pipe temperature and the preset pipe temperatures.

Further, the processor 1001 can call the computer-readable instructions stored in the memory 1005 and also perform the following operations:
  in response to that the second pipe temperature is greater than the first pipe temperature, acquiring first preset temperatures higher than the first pipe temperature among the preset pipe temperatures;
  acquiring a second target pipe temperature which is the lowest of the first preset temperatures, and acquiring the target opening degree according to the second target pipe temperature.

Further, the processor 1001 can call the computer-readable instructions stored in the memory 1005 and also perform the following operations:
  in response to that the second pipe temperature is lower than the first pipe temperature, acquiring second preset temperatures lower than the first pipe temperature among the preset pipe temperatures;
  acquiring a third target pipe temperature which is the highest among the second preset temperatures, and acquiring the target opening degree according to the third target pipe temperature.

Further, the processor 1001 can call the computer-readable instructions stored in the memory 1005 and also perform the following operations:
  in response to that a cold storage instruction is detected, starting a cooling fan of the air conditioner;
  in response to that the cooling fan is operated for a second preset duration, starting the compressor of the air conditioner.

Further, the processor 1001 can call the computer-readable instructions stored in the memory 1005 and also perform the following operations:
  in response to that the compressor is a constant frequency compressor, controlling the compressor to operate according to a first preset frequency.

Further, the processor 1001 can call the computer-readable instructions stored in the memory 1005 and also perform the following operations:
  in response to that the compressor is a variable frequency compressor, controlling the compressor to operate according to a low frequency;
  in response to that a duration of the compressor operating at the low frequency reaches a third preset duration, adjusting an operating frequency of the compressor according to a second preset frequency greater than the low frequency.

Further, the processor 1001 can call the computer-readable instructions stored in the memory 1005 and also perform the following operations:

increasing the operating frequency of the compressor to reach the second preset frequency according to a preset time interval and a preset step size.

Further, the processor 1001 can call the computer-readable instructions stored in the memory 1005 and also perform the following operations:

in response to that an operating duration of the compressor reaches a fourth preset duration, executing the acquiring the ambient temperature around the air conditioner and the first pipe temperature of the exhaust pipe of the compressor.

Further, the processor 1001 can call the computer-readable instructions stored in the memory 1005 and also perform the following operations:

acquiring a cold storage temperature in a cold storage box of the air conditioner, and determining whether the cold storage temperature reaches a third preset temperature;

in response to that the cold storage temperature reaches the third preset temperature, turning off the compressor;

in response to that a duration since the compressor is turned off reaches a fifth preset duration, turning off the cooling fan.

Further, the processor 1001 can call the computer-readable instructions stored in the memory 1005 and also perform the following operations:

in response to that a duration since the opening degree of the throttle device is adjusted to be the target opening degree reaches a sixth preset duration, repeating the acquiring the ambient temperature around the air conditioner and the first pipe temperature of the exhaust pipe of the compressor.

Figure 2:
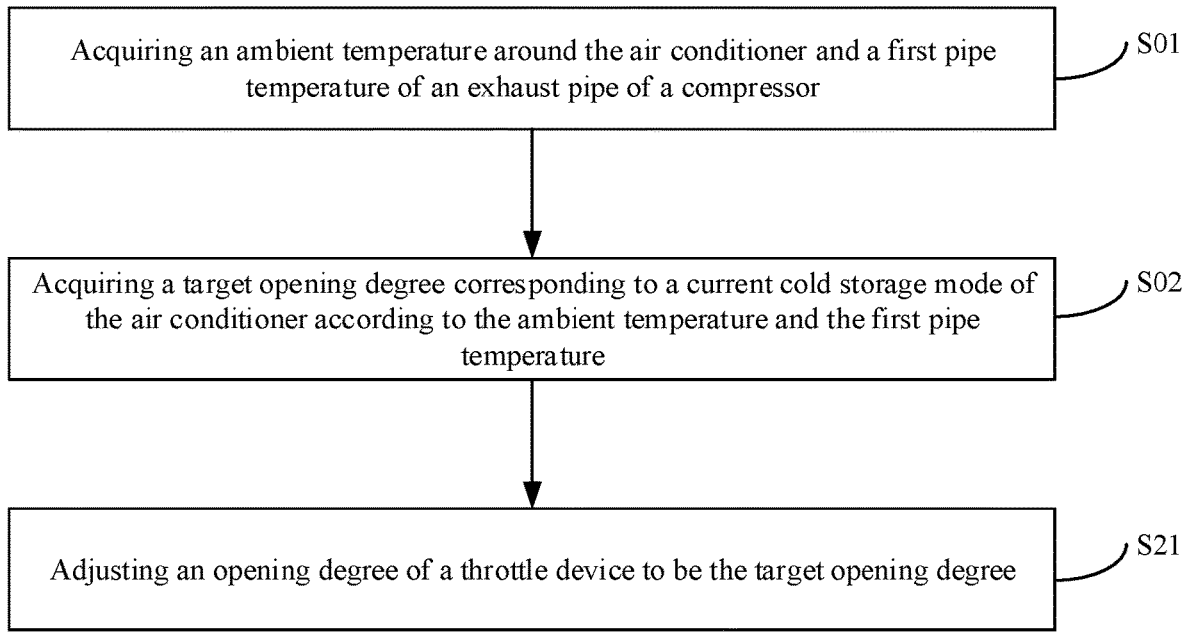
FIG. 2 is a flow chart of a method for controlling cold storage of an air conditioner according to a first embodiment of the present application.

The present application also provides a method for controlling cold storage of an air conditioner. Referring to FIG. 2, a flow chart of the method for controlling cold storage of the air conditioner according to a first embodiment of the present application is shown.

Figure 3:
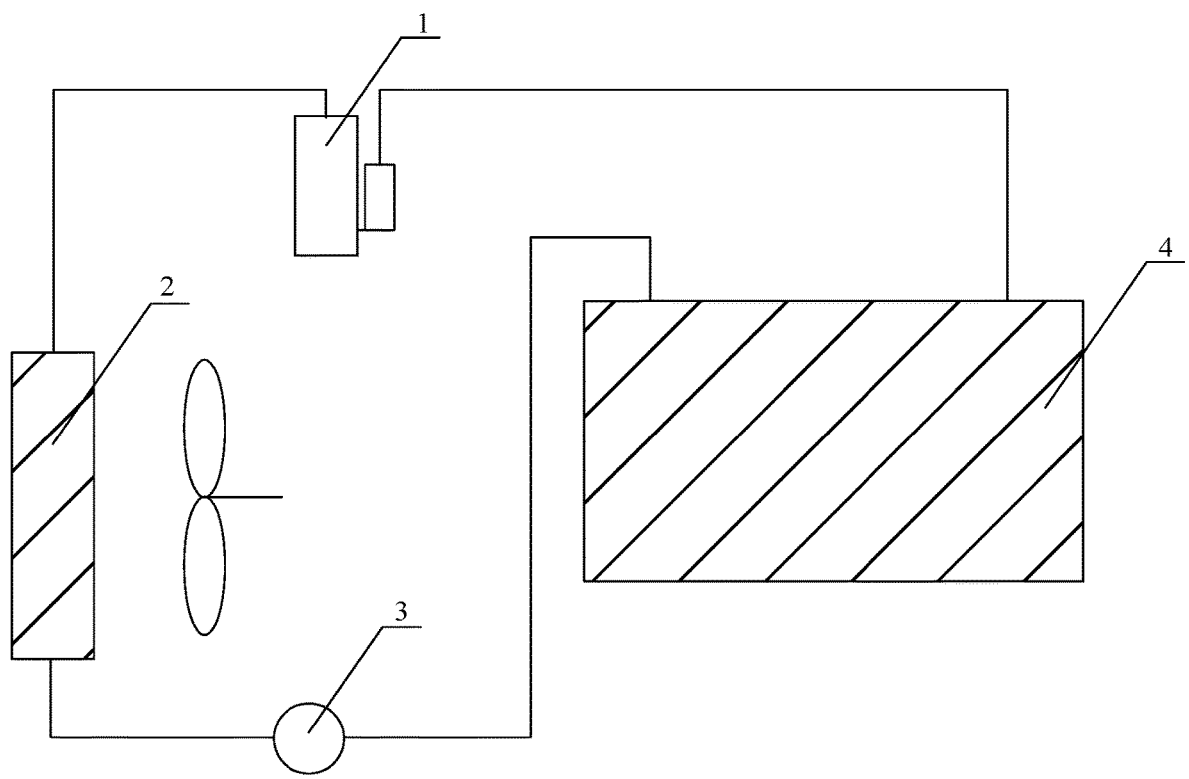
FIG. 3 is a structural diagram of an air conditioner according to the present application.

Referring to FIG. 3, a cold storage system of the air conditioner includes a compressor 1, a condenser 2, a throttle device 3 and a cold storage box 4. The cold storage system can store cold energy in advance through cold storage materials and then selectively release the cold energy when needed. Among them, the throttle device 3 is a core device of the present application, which is a new type of throttle control element. The throttle device 3 is placed in the cold storage system, and is a core control element to realize the control of this cold storage system. The throttle device 3 is arranged at a pipe between the cold storage box 4 and the condenser 2. Specifically, the throttle device 3 is arranged at a pipe between a refrigerant inlet of a heat exchanger of the cold storage box 4 and a refrigerant outlet of the condenser 2. The throttle device 3 is the main component of a refrigeration system, and is installed at an entrance of the cold storage box 4 and is a dividing point between high pressure and low pressure of the cold storage system. The throttle device 3 can throttle and reduce the pressure of the high-pressure liquid refrigerant from the condenser 2, adjust and control the flow of liquid refrigerant into the cold storage tank 4, and further control the cold storage process of the air conditioner to achieve different effects. It should be noted that the throttle device 3 can be a throttle valve, an electromagnetic valve or an electronic expansion valve.

When the cold storage system of the air conditioner begins to store cold energy, the compressor 1 delivers high-temperature and high-pressure gaseous refrigerant to the condenser 2. The high-temperature and high-pressure gaseous refrigerant is cooled by condenser 2 and the cooling fan, and becomes high-pressure and low-temperature liquid refrigerant. The high-pressure refrigerant is throttled by the throttle device 3 and input to the cold storage box 4. Through heat exchange in the cold storage box 4, the cold energy in the refrigerant is stored in cold storage box 4, and the refrigerant absorbs heat in the cold storage box 4 and becomes low-pressure gas refrigerant. The low-pressure gas refrigerant is input to the compressor 1 through an air inlet of the compressor 1, and reciprocating cycles are formed. During the reciprocating cycles, the refrigerant in the cold storage box 4 reduces the cool-thermal material in the cold storage box 4 from a normal temperature to a low temperature and stores in the cold storage box 4.

In this embodiment, the method for controlling cold storage of the air conditioner includes:

operation S10, acquiring an ambient temperature around the air conditioner and a first pipe temperature of an exhaust pipe of the compressor.

In this embodiment, the ambient temperature refers to a temperature of the environment where the air conditioner is located, which can be an indoor temperature or an outdoor temperature. The ambient temperature is detected by an ambient temperature sensor, and the ambient temperature sensor can be installed at an air inlet of the air conditioner and supported by a plastic part. The temperature of the exhaust pipe refers to the temperature of the exhaust pipe communicating with an exhaust port of the compressor, the temperature of the exhaust pipe is detected by an exhaust pipe temperature sensor installed on the exhaust pipe, for example, the exhaust pipe temperature sensor is arranged on an outer surface of the exhaust pipe. This embodiment can be applied to a cold storage air conditioner with a condenser, a heat exchanger, a throttle device and a cool storage box.

In this embodiment, during the cold storage process of the air conditioner, the ambient temperature around the air conditioner is acquired according to a detection result of the ambient temperature sensor, and the first pipe temperature of the exhaust pipe is acquired according to a detection result of the exhaust pipe temperature sensor. In the cold storage process of the air conditioner, the ambient temperature and the first pipe temperature can be acquired in real time or regularly.

Understandably, if a cold storage instruction is detected, the cold storage process is started, at first, the cooling fan is started, and then the compressor is started after the cooling fan is operated for a period of time. The compressor needs to operate for a period of time to wait for the air conditioner to establish pressure balance, and then the ambient temperature and the first pipe temperature are detected.

Operation S20, acquiring a target opening degree corresponding to a current cold storage mode of the air conditioner according to the ambient temperature and the first pipe temperature.

Cold storage modes include a fast cold storage mode and an energy-saving mode. The target opening degree is a parameter for adjusting the opening degree of the throttle device. Different cold storage modes correspond to different target opening degrees.

In this embodiment, when the ambient temperature and the first pipe temperature are acquired, the target opening degree corresponding to the current cold storage mode of the air conditioner is acquired. For example, the air conditioner pre-stores mapping relationships among ambient temperatures, pipe temperatures and opening degrees of the throttle device under different cold storage modes, and the air conditioner determines the target opening degree according to the currently detected cold storage mode, ambient temperature and first pipe temperature according to the mapping relationships.

For example, through a cold storage experiment, different opening degrees of the throttle device under different combinations of ambient temperatures and temperatures of the exhaust pipe are tested to acquire the optimal opening degrees in the current environment, and an experimental result data table is made, in which relationships among ambient temperatures, temperatures of the exhaust pipe and opening degrees of the throttle device are recorded, namely different ambient temperature ranges, different temperatures of the exhaust pipe, and optimal opening degrees corresponding to the different ambient temperatures and different temperatures of the exhaust pipe. The air conditioner can acquire the optimal opening degree namely the target opening degree from the experimental result data table according to the detected ambient temperature and temperature of the exhaust pipe, as shown in Table 1.

TABLE 1

Relationships among ambient temperatures, temperatures of the exhaust pipe and opening degrees of the throttle device

| Ambient temperature | Temperature of the exhaust pipe ° C. | Opening degree of the throttle device (for reference) |
|---|---|---|
| Below 22° C. | 20 | 190 |
|  | 30 | 200 |
|  | 40 | 210 |
| 22-32° C. | 40 | 210 |
|  | 50 | 220 |
|  | 60 | 230 |
| 32-38° C. | 50 | 220 |
|  | 60 | 230 |
|  | 70 | 240 |
| 38-45° C. | 60 | 230 |
|  | 70 | 240 |
|  | 80 | 250 |
| Above 45° C. | 80 | 250 |
|  | 90 | 260 |
|  | 100 | 270 |

In the experimental result data table, as shown in Table 1, a preset temperature range set includes five intervals, which are "below 22° C.," "22-32° C.," "32-38° C.," "38-45° C." and "above 45° C." Correspondingly, different preset temperature ranges correspond to different preset pipe temperatures, including that the preset temperature range "below 22" corresponds to the preset pipe temperature 20° C., 30° C. or 40° C., the preset temperature range "22-32° C." corresponds to the preset pipe temperature 40° C., 50° C. or 60° C., the preset temperature range "32-38° C." corresponds to the preset pipe temperature 50° C., 60° C. or 70° C., the preset temperature range "38-45° C." corresponds to the preset pipe temperature 60° C., 70° C. or 80° C., and the preset temperature range "above 45° C." corresponds to the preset pipe temperature 80° C., 90° C. or 100° C. Correspondingly, different preset pipe temperatures correspond to different opening degrees of the throttle device, and the preset pipe temperature 20° C. corresponds to the opening degree of the throttle device 190. When the preset pipe temperature is increased by 10° C., the corresponding opening degree of the throttle device is increased by 10 till that the preset pipe temperature reaches 100° C., and the corresponding opening degree of the throttle device increases to 270. The opening degree of the throttle device is acquired from experiments, which is not unique.

Operation S30, adjusting an opening degree of a throttle device to be the target opening degree.

In this embodiment, when the opening degree of the throttle device is adjusted to be the target opening degree, the air conditioner converts the acquired target opening degree into an electrical signal, and controls a voltage or a current applied to the throttle device according to the electrical signal, so as to adjust the opening degree of the throttle device to the target opening degree, and further control the refrigerant flow flowing through the throttle device.

For example, when the user turns on the fast cold storage mode, during the cold storage process, the ambient temperature and the temperature of the exhaust pipe (the first pipe temperature) are continuously detected, and the opening degree of the throttle device is constantly adjusted according to the relationships between the ambient temperatures and the temperatures of the exhaust pipe, so as to control the cooling capacity of the air conditioner to be as large as possible and the cooling to be as fast as possible, and the cold storage capacity of the air conditioner is the largest at this time. When the user turns on the energy-saving mode, during the cold storage process, the system continuously detects the ambient temperature and the temperature of the exhaust pipe, and continuously adjusts the opening degree of the throttle device according to the relationships between the ambient temperatures and the temperatures of the exhaust pipe, so as to control the cooling capacity and power consumption of the cold storage system to reach a balance and maximize the energy efficiency. At this time, the cold storage efficiency of the air conditioner is the highest. Therefore, the refrigerant flow in the throttle device can be controlled according to different opening degrees to control the cold storage process, so that the cold storage air conditioner can be adjusted according to the actual environment and the cold storage progress, ensuring the highest capacity or the highest energy efficiency, and adapting to different cold storage requirements of users, such as the requirement for rapid cold storage experience or energy-saving experience.

Further, in one embodiment, after operation S30, the method for controlling cold storage of the air conditioner further includes:

in response to that a duration since the opening degree of the throttle device is adjusted to be the target opening degree reaches a sixth preset duration, repeating the acquiring the ambient temperature around the air conditioner and the first pipe temperature of the exhaust pipe of the compressor.

In this embodiment, the target opening degree is acquired and the opening degree of the throttle device is adjusted to the target opening degree, thus one circle of air-conditioning cold storage control is completed. After the opening degree of the throttle device is adjusted to be the target opening degree for a period of time, the operations of the air-conditioning cold storage control process are executed circularly. By continuously adjusting the opening degree of the throttle device according to the relationships between the ambient temperatures and the temperatures of exhaust pipe, the refrigerant flow of the air conditioner can be continuously controlled, so that the cooling time can be shortened as much as possible and the efficiency can be as high as possible.

In this embodiment, an ambient temperature around the air conditioner and a first pipe temperature of an exhaust pipe of a compressor are acquired, then a target opening degree corresponding to a current cold storage mode of the air conditioner is acquired according to the ambient temperature and the first pipe temperature, and finally an opening degree of a throttle device is adjusted to be the target opening degree. The refrigerant flow adjustment in the cold storage process is realized by adjusting the opening degree of the throttle device according to the cold storage mode, the ambient temperature and the temperature of the exhaust pipe, thereby improving the cold storage capacity of the air conditioner.

Based on the first embodiment, the method for controlling cold storage of the air conditioner according to a second embodiment of the present application is proposed. In this embodiment, operation S20 includes:

operation a, detecting whether there exists a target temperature range matching the ambient temperature in preset temperature ranges of a preset temperature range set.

In this embodiment, the preset temperature range set includes different preset temperature ranges. After the ambient temperature is acquired, the preset temperature range that the ambient temperature falls in is determined from the preset temperature ranges, and the preset temperature range that the ambient temperature falls in is the target temperature range.

For example, there are five intervals of preset temperature range in the preset temperature range set, which are "below 22° C.," "22-32° C.," "32-38° C.," "38-45° C." and "above 45° C." After the ambient temperature is acquired, the preset temperature range that the ambient temperature falls in is determined from the five preset temperature ranges, and the preset temperature range matching the ambient temperature is the target temperature range. If the detected ambient temperature is 35° C., among the preset temperature ranges "below 22° C.," "22-32° C.," "32-38° C.," "38-45° C." and "above 45° C.," the preset temperature range matching 35° C. is determined, that is, "32-38° C." is the target temperature range.

Operation b, in response to that the target temperature range exists, acquiring the target temperature range.

In this embodiment, after determining that the preset temperature range matching the ambient temperature is the target temperature range, if there exists such preset temperature range among the preset temperature ranges, the corresponding preset temperature range, that is, the target temperature range is acquired.

For example, among the five preset temperature ranges, after determining that the target temperature range matching the ambient temperature 35° C. is "32-38° C.," the control system acquires "32-38° C." and sets "32-38° C." as the target temperature range.

Operation c, acquiring the target opening degree according to the target temperature range and the first pipe temperature.

In this embodiment, when the target temperature range and the first pipe temperature are acquired, the target opening degree corresponding to the current cold storage mode of the air conditioner is acquired. For example, the air conditioner pre-stores the mapping relationships among ambient temperature ranges, pipe temperatures and opening degrees of the throttle device under different cold storage modes, and the air conditioner determines the target opening degree according to the currently detected cold storage mode, the target temperature range and the first pipe temperature according to the mapping relationships.

For example, according to the acquired target temperature range and the first pipe temperature, the preset pipe temperatures are determined corresponding to the target temperature range, and whether the first pipe temperature is equal to a preset pipe temperature is determined. If the first pipe temperature is equal to the preset pipe temperature, the opening degree of the throttle device corresponding to the preset pipe temperature, that is, the target opening degree is directly acquired. If the first pipe temperature is not equal to the preset pipe temperature, but is between two adjacent preset pipe temperatures, then a second pipe temperature is detected. If the second pipe temperature is higher than the first pipe temperature, the corresponding preset pipe temperature is the relatively higher preset pipe temperature. If the second pipe temperature is lower than the first pipe temperature, the corresponding preset pipe temperature is the relatively lower preset pipe temperature. That is, by judging whether the temperature of the exhaust pipe is rising or falling, the preset pipe temperature is determined, and the target opening degree is further determined and acquired.

For example, if the target temperature range is "32-38° C.," it is judged whether the first pipe temperature is equal to 50° C., 60° C. or 70° C. among the preset pipe temperatures corresponding to "32-38° C." If the first pipe temperature is 30° C., the opening degree of the throttle device is set to be 200. If the first pipe temperature is equal to 35° C., the second pipe temperature is detected after 15 seconds. If the second pipe temperature is higher than 35° C., the temperature of the exhaust pipe is rising, thus the target opening degree is the opening degree of the throttle device corresponding to the pipe temperature 40° C., that is, 210. If the second pipe temperature is lower than 35° C., the temperature of the exhaust pipe is falling, thus the target opening degree is the opening degree of the throttle device corresponding to the pipe temperature 30° C., that is, 200.

In this embodiment, whether there is a target temperature range matching the ambient temperature in the preset temperature ranges of the preset temperature range set is determined, if there is such target temperature range, such target temperature range is acquired, and the target opening degree is acquired according to such target temperature range and the first pipe temperature, so that the target opening degree of the throttle device can be accurately determined according to the target temperature range and the first pipe temperature, and the accuracy of the target opening degree is improved, thereby improving the accuracy of refrigerant flow adjustment in the cold storage process.

Based on the second embodiment, the method for controlling cold storage of the air conditioner according to a third embodiment of the present application is proposed. In this embodiment, operation c includes:

operation d, detecting whether there is a first target pipe temperature matching the first pipe temperature among a plurality of preset pipe temperatures corresponding to the target temperature range.

In this embodiment, different target temperature ranges correspond to a plurality of different preset pipe temperatures. Among the plurality of preset pipe temperatures corresponding to the acquired target temperature range, the preset pipe temperature matching the first pipe temperature is determined, and the preset pipe temperature matching the first pipe temperature is the first target pipe temperature.

For example, the preset pipe temperature corresponding to the target temperature range "below 22° C." is 20° C., 30° C. or 40° C., the preset pipe temperature corresponding to the target temperature range "22-32° C." is 40° C., 50° C. or 60° C., the preset pipe temperature corresponding to the target temperature range "32-38° C." is 50° C., 60° C. or 70° C., the preset pipe temperature corresponding to the target temperature range "38-38° C." is 60° C., 70° C. or 80° C., and the preset pipe temperature corresponding to the target temperature range "above 45° C." is 80° C., 90° C. or 100° C.

For example, if the target temperature range is "32-38° C.," it is judged whether the first pipe temperature is equal to 50° C., 60° C. or 70° C. from the preset pipe temperature 50° C., 60° C. or 70° C.

Operation e, in response to that the first target pipe temperature exists, acquiring the target opening degree according to the first target pipe temperature.

In this embodiment, among a plurality of preset pipe temperatures, after the first target pipe temperature matching the first pipe temperature is determined, if there is a matched first target pipe temperature, the corresponding first target pipe temperature is acquired, and the target opening degree is directly acquired according to the first target pipe temperature.

For example, if the first pipe temperature is 60° C., there is a first target pipe temperature matching the first pipe temperature 60° C., then the target opening degree 230 is directly acquired according to the first target pipe temperature 60° C., and the opening degree of the throttle device is set to 230.

In this embodiment, whether there exists a first target pipe temperature matching the first pipe temperature among the plurality of preset pipe temperatures corresponding to the target temperature range is detected, if the first target pipe temperature exists, the target opening degree of the throttle device can be acquired according to the first target pipe temperature, so that the target opening degree can be accurately determined according to the first target pipe temperature, and the accuracy of refrigerant flow adjustment in the cold storage process can be improved.

Based on the third embodiment, the method for controlling cold storage of the air conditioner according to a fourth embodiment of the present application is proposed. In this embodiment, operation d includes:

operation f, in response to that the first target pipe temperature does not exist and a duration since the first pipe temperature is acquired reaches a first preset duration, acquiring a current second pipe temperature of the exhaust pipe.

In this embodiment, after determining the first target pipe temperature matching the first pipe temperature among the plurality of preset pipe temperatures, if there exists no first target pipe temperature matching the first pipe temperature, the current temperature of the exhaust pipe is acquired as the second pipe temperature when a duration since the first pipe temperature is required reaches a first preset duration. The first preset duration can be set to be 10 seconds, 15 seconds, 20 seconds, or the like, which is not limited in this embodiment.

For example, if the first pipe temperature is 65° C., there is no first target pipe temperature matching the first pipe temperature among the corresponding preset pipe temperatures 50° C., 60° C. and 70° C., and then the current temperature of the exhaust pipe is acquired as the second pipe temperature when the duration of the first pipe temperature being detected reaches the first preset duration.

Operation g, acquiring the target opening degree according to the first pipe temperature, the second pipe temperature and each preset pipe temperature.

In this embodiment, the target opening degree is acquired according to the acquired relationships among the first pipe temperature, the second pipe temperature and each preset pipe temperature. If the second pipe temperature is larger than the first pipe temperature, the corresponding preset pipe temperature is the relatively higher preset pipe temperature. If the second pipe temperature is lower than the first pipe temperature, the corresponding preset pipe temperature is the relatively lower preset pipe temperature. That is, by judging whether the temperature of the exhaust pipe is rising or falling, the preset pipe temperature is determined, and the target opening degree is further determined and acquired.

For example, if the first pipe temperature is 65° C., the second pipe temperature is detected after 15 seconds. If the second pipe temperature is higher than 65° C., the temperature of the exhaust pipe is rising, thus the target opening degree is the opening degree of the throttle device corresponding to the pipe temperature 70° C., namely 240. If the second pipe temperature is lower than 65° C., the temperature of the exhaust pipe is falling, thus the target opening degree is the opening degree of the throttle device corresponding to the pipe temperature 60° C., namely 230.

In this embodiment, if the first target pipe temperature does not exist, when a duration since the first pipe temperature is acquired reaches the first preset duration, a current second pipe temperature of the exhaust pipe is acquired, and the target opening degree is acquired according to the first pipe temperature, the second pipe temperature and each preset pipe temperature, so that the target opening degree of the throttle device can be accurately determined according to the second pipe temperature when the first target pipe temperature does not exist, and the accuracy of the target opening degree is improved, thereby improving the accuracy of refrigerant flow adjustment in the cold storage process.

Based on the fourth embodiment, the method for controlling cold storage of the air conditioner according to a fifth embodiment of the present application is proposed. In this embodiment, operation g includes:

operation h, in response to that the second pipe temperature is greater than the first pipe temperature, acquiring first preset temperatures higher than the first pipe temperature among the preset pipe temperatures.

In this embodiment, if the second pipe temperature is higher than the first pipe temperature, then first preset temperatures higher than the first pipe temperature are acquired from the preset pipe temperatures first.

For example, if the preset temperature range is 38-45° C., the corresponding preset pipe temperatures are 60° C., 70° C. and 80° C. If the detected second pipe temperature is 69° C., which is higher than the first pipe temperature 65° C., then the first preset temperatures are 70° C. and 80° C.

Operation i, acquiring a second target pipe temperature which is the lowest among the first preset temperatures, and acquiring the target opening degree according to the second target pipe temperature.

In this embodiment, after acquiring the first preset temperatures larger than the first pipe temperature from the preset pipe temperatures, the second target pipe temperature which is the lowest is acquired from the first preset temperatures, and the target opening degree can be directly acquired according to the second target pipe temperature to control the opening degree of the throttle device.

For example, if the first preset temperatures are 70° C. and 80° C., the smallest preset temperature, that is, the second target pipe temperature is 70° C., and the corresponding target opening degree 240 is directly acquired according to the second target pipe temperature 70° C.

Understandably, if the second pipe temperature is greater than the first pipe temperature, the pipe temperature of the exhaust pipe increases, and the temperature of the refrigerant discharged from the exhaust port of the compressor increases. The target opening degree is determined by the first preset temperatures higher than the first pipe temperature, so that the target opening degree is greater than the current opening degree of the throttle device, the refrigerant flow in the refrigerant pipeline is increased, the temperature of the refrigerant discharged from the exhaust port of the compressor is reduced, and the pipe temperature of the exhaust pipe is also reduced.

It should be noted that if the second pipe temperature is equal to the first pipe temperature, the second pipe temperature is taken as the first pipe temperature, and the in response to that the first target pipe temperature does not exist and the duration since the first pipe temperature is acquired reaches the first preset duration, acquiring the current second pipe temperature of the exhaust pipe is repeated.

In this embodiment, if the second pipe temperature is greater than the first pipe temperature, first preset temperatures among the preset pipe temperatures are acquired, and then a second target pipe temperature which is the smallest among the first preset temperatures is acquired, and the target opening degree is acquired according to the second target pipe temperature. When the second pipe temperature is less than the first pipe temperature, the target opening degree of the throttle device can be accurately determined according to the first pipe temperature and the second pipe temperature, so as to improve the accuracy of the target opening degree and further improve the accuracy of refrigerant flow adjustment in the cold storage process.

Based on the fifth embodiment, the method for controlling cold storage of the air conditioner according to a sixth embodiment of the present application is proposed. In this embodiment, operation i includes:

operation j, in response to that the second pipe temperature is lower than the first pipe temperature, acquiring second preset temperatures lower than the first pipe temperature among the preset pipe temperatures.

In this embodiment, if the second pipe temperature is lower than the first pipe temperature, then the first preset temperatures lower than the first pipe temperature are acquired from the preset pipe temperatures first.

For example, if the preset temperature range is "32-38° C." and the first pipe temperature is 65° C., the corresponding preset pipe temperatures are 50° C., 60° C. and 70° C. If the detected second pipe temperature is 62° C. and lower than the first pipe temperature 65° C., then the first preset temperatures are 50° C. and 60° C.

Operation k, acquiring a third target pipe temperature which is the highest among the second preset temperatures, and acquiring the target opening degree according to the third target pipe temperature.

In this embodiment, after acquiring the first preset temperatures lower than the first preset temperature from the preset pipe temperatures, a third target pipe temperature which is the highest is acquired from the first preset temperatures, and the target opening degree can be directly acquired according to the third target pipe temperature to control the size of the throttle device.

For example, if the first preset temperatures are 50° C. and 60° C., the maximum preset temperature, that is, the third target pipe temperature is 60° C., and the corresponding target opening degree 230 is directly acquired according to the second target pipe temperature 60° C.

Understandably, if the second pipe temperature is lower than the first pipe temperature, the pipe temperature of the exhaust pipe decreases, and the temperature of the refrigerant discharged from the exhaust port of the compressor decreases. The target opening degree is determined by the second preset temperature lower than the first pipe temperature, so that the target opening degree is smaller than the current opening degree of the throttle device, the refrigerant flow in the refrigerant pipeline is reduced, the temperature of the refrigerant discharged from the exhaust port of the compressor is increased, and the pipe temperature of the exhaust pipe is also increased.

In this embodiment, if the second pipe temperature is less than the first pipe temperature, second preset temperatures is acquired among the preset pipe temperatures, and then a third target pipe temperature which is the largest among the second preset temperatures is acquired, and the target opening degree is acquired according to the third target pipe temperature. When the second pipe temperature is less than the first pipe temperature, the target opening degree of the throttle device can be accurately determined according to the first pipe temperature and the second pipe temperature, thereby improving the accuracy of the target opening degree, and further improving the refrigerant flow adjustment in the cold storage process.

Based on the first embodiment, the method for controlling cold storage of the air conditioner according to a seventh embodiment of the present application is proposed. In this embodiment, before operation S10, the method includes:

operation 1, in response to that a cold storage instruction is detected, starting a cooling fan of the air conditioner.

In this embodiment, when the system detects a cold storage instruction, which means the start of the cold storage process, a cooling fan of the air conditioner is controlled to start first.

Operation m, starting the compressor of the air conditioner in response to that the cooling fan is operated for a second preset duration.

In this embodiment, when the cold storage process is started, the cooling fan of the air conditioner is controlled to start first and operate for a period of time, and then the compressor is started for a period of time. The purpose of controlling the cooling fan of the air conditioner to start and operate at first is to let the cooling fan to dissipate the heat of the system, so that the time for the cold storage process is less, the cold storage is faster and the energy consumption is reduced at the same time.

The second preset duration can be reasonably set, and the second preset duration can be set to not less than 8 seconds and not greater than 15 seconds, for example, the second preset duration is 10 seconds.

Operation m includes controlling the compressor to operate according to a first preset frequency in response to that the compressor is a constant frequency compressor.

If the compressor is a constant frequency compressor, after the compressor is started, the compressor is controlled to operate according to a first preset frequency. For example, the first preset frequency is 55 Hz.

Operation m includes: controlling the compressor to operate according to a low frequency in response to that the compressor is a variable frequency compressor;

in response to that a duration of the compressor operating at the low frequency reaches a third preset duration, adjusting an operating frequency of the compressor according to a second preset frequency greater than the low frequency.

The third preset duration can be reasonably set, and the third preset duration can be set to be not less than 10 seconds and not greater than 20 seconds, for example, the third preset duration is 15 seconds.

Specifically, if the compressor is a variable frequency compressor, after the compressor is started, the compressor is first controlled to operate at a low frequency for a third preset duration, and when the duration of the compressor operating at the low frequency reaches the third preset duration, the operating frequency of the compressor is controlled to gradually increase according to a preset time interval and a preset step size till the operating frequency of the compressor reaches a second preset frequency greater than the first preset frequency. For example, when the compressor of the cold storage air conditioner is a variable frequency compressor, the compressor is first controlled to operate at a low frequency for a period of time, usually 15 seconds, and then the operating frequency of the compressor is controlled to gradually increase from 15 Hz to 55 Hz or to 75 Hz.

Because the compressor is easy to be damaged when the compressor is started at a high frequency, the service life of the compressor can be prolonged by gradually increasing the operating frequency of the variable frequency compressor from the low frequency, and gradually changing the compressor from low speed to high speed. By controlling the compressor to operate at 55 Hz or 75 Hz, it is possible to control the cold storage system to refrigerate as fast as possible or to balance the refrigerating capacity and power consumption.

Further, in one embodiment, the adjusting the operating frequency of the compressor according to the second preset frequency includes increasing the operating frequency of the compressor according to the preset time interval and the preset step size, so that the operating frequency of the compressor can reach the second preset frequency.

Specifically, the variable frequency compressor is controlled to increase from the low frequency to the second operating frequency, so that the operating frequency of the compressor gradually increases according to the preset time interval and preset step size. For example, the variable compressor is controlled to increase from the low frequency 15 Hz to 55 Hz or to 75 Hz according to a preset time interval of 15 seconds and a preset step size of 10 Hz. Similarly, when the operating frequency of the air conditioner compressor is 55 Hz, the energy efficiency of the air conditioner is the highest, and the cold storage and power consumption are balanced to maximize the energy efficiency. When the operating frequency of the air-conditioning compressor is 75 Hz, the capacity of the air conditioner is the highest, the refrigerating capacity is the largest, and the energy consumption is the largest, so that the cold storage capacity of the air conditioner is the largest, and the effect of rapid cold storage can be achieved.

In this embodiment, a cooling fan of the air conditioner is started when a cold storage instruction is detected, if a duration of the cooling fan being operated reaches a second preset duration, the compressor of the air conditioner is started. By starting the cooling fan of the air conditioner for a period of time before the compressor is started, the cooling fan can blow away the heat of the system before the cold storage is started, so that the cold storage process takes less time, the cold storage is faster and the energy consumption is reduced at the same time.

Based on the seventh embodiment, the method for controlling cold storage of the air conditioner according to a eleventh embodiment of the present application is proposed. In this embodiment, after operation m, the method includes:

operation n, in response to that an operating duration of the compressor reaches a fourth preset duration, executing the acquiring the ambient temperature around the air conditioner and the first pipe temperature of the exhaust pipe of the compressor.

In this embodiment, after the compressor is started, the compressor is operated for a fourth preset time, and then the operation of acquiring the ambient temperature and the first pipe temperature in the cold storage process is executed.

The fourth preset duration can be reasonably set, and the fourth preset duration can be set to be not less than 3 minutes and not greater than 7 minutes, for example, the fourth preset duration is 5 minutes.

In this embodiment, after the compressor is started, if the compressor operates for the fourth preset time, the ambient temperature and the first pipe temperature are acquired. Before performing the operation of detecting the ambient temperature and the temperature of the exhaust pipe in the cold storage process, the compressor is operated for a period of time in order to establish the pressure balance of the system. After the air conditioner operates stably, the operation of adjusting the throttle device is performed to ensure the normal operation of the subsequent cold storage control process of the air conditioner.

Based on the first embodiment, the method for controlling cold storage of the air conditioner according to a twelfth embodiment of the present application is proposed. In this embodiment, after operation S30, the method includes:

operation o, acquiring a cold storage temperature in the cold storage box of the air conditioner, and determining whether the cold storage temperature reaches a third preset temperature.

In this embodiment, a cold storage temperature in the cold storage box is detected. After the system acquires the cold storage temperature, whether the cold storage temperature reaches a third preset temperature is judged, the third preset temperature is generally $-5°$ C., that is, whether the detected temperature in the cold storage box reaches $-5°$ C. is judged.

Operation p, in response to that the cold storage temperature reaches the third preset temperature, turning off the compressor.

In this embodiment, if the cold storage temperature in the cold storage box reaches the third preset temperature, it means that the cold storage is completed and the stored cold energy is sufficient, thus the compressor is turned off and not allowed to continue to operate.

Operation q, in response to that a duration since the compressor is turned off reaches a fifth preset duration, turning off the cooling fan.

In this embodiment, if a duration since the compressor is turned off reaches a fifth preset duration, the cooling fan is turned off, that is, after the compressor is turned off, the cooling fan continues to operate for a period of time, generally $10s$.

In this embodiment, a cold storage temperature in a cold storage box of the air conditioner is acquired, it is judged whether the cold storage temperature reaches a third preset temperature, if the cold storage temperature reaches the third preset temperature, the compressor is turned off. If a duration since the compressor is turned off reaches a fifth preset duration, the cooling fan is turned off. When the temperature in the cold storage box reaches the third preset temperature, the compressor and cooling fan are turned off in time to save energy and reduce pollution. At the same time, the cooling fan is turned off to dissipate the residual heat of the air conditioner after the compressor is turned off.

In addition, the embodiments of the present application also provide a computer-readable storage medium, in which a cold storage program is stored. When the cold storage program is executed by a processor, the following operations are realized:

acquiring an ambient temperature around the air conditioner and a first pipe temperature of an exhaust pipe of a compressor;

acquiring a target opening degree corresponding to a current cold storage mode of the air conditioner according to the ambient temperature and the first pipe temperature;

adjusting an opening degree of a throttle device to be the target opening degree.

Further, when the cold storage program is executed by the processor, the following operations are also realized:

detecting whether there exists a target temperature range matching the ambient temperature in preset temperature ranges of a preset temperature range set;

in response to that the target temperature range exists, acquiring the target opening degree according to the target temperature range and the first pipe temperature.

Further, when the cold storage program is executed by the processor, the following operations are also realized:

detecting whether there exists a first target pipe temperature matching the first pipe temperature among a plurality of preset pipe temperatures corresponding to the target temperature range;

in response to that the first target pipe temperature exists, acquiring the target opening degree according to the first target pipe temperature.

Further, when the cold storage program is executed by the processor, the following operations are also realized:

in response to that the first target pipe temperature does not exist and a duration since the first pipe temperature is acquired reaches a first preset duration, acquiring a current second pipe temperature of the exhaust pipe;

acquiring the target opening degree according to the first pipe temperature, the second pipe temperature and the preset pipe temperatures.

Further, when the cold storage program is executed by the processor, the following operations are also realized:

in response to that the second pipe temperature is greater than the first pipe temperature, acquiring first preset temperatures higher than the first pipe temperature among the preset pipe temperatures;

acquiring a second target pipe temperature which is the lowest among the first preset temperatures, and acquiring the target opening degree according to the second target pipe temperature.

Further, when the cold storage program is executed by the processor, the following operations are also realized:

in response to that the second pipe temperature is lower than the first pipe temperature, acquiring second preset temperatures lower than the first pipe temperature among the preset pipe temperatures;

acquiring a third target pipe temperature which is the highest among the second preset temperatures, and acquiring the target opening degree according to the third target pipe temperature.

Further, when the cold storage program is executed by the processor, the following operations are also realized:

in response to that a cold storage instruction is detected, starting a cooling fan of the air conditioner;

in response to that the cooling fan is operated for a second preset duration, starting the compressor of the air conditioner.

Further, when the cold storage program is executed by the processor, the following operations are also realized:

in response to that the compressor is a constant frequency compressor, controlling the compressor to operate according to a first preset frequency.

Further, when the cold storage program is executed by the processor, the following operations are also realized:

in response to that the compressor is a variable frequency compressor, controlling the compressor to operate according to a low frequency;

in response to that a duration of the compressor operating at the low frequency reaches a third preset duration, adjusting an operating frequency of the compressor according to a second preset frequency greater than the low frequency.

Further, when the cold storage program is executed by the processor, the following operations are also realized:

increasing the operating frequency of the compressor to reach the second preset frequency according to a preset time interval and a preset step size.

Further, when the cold storage program is executed by the processor, the following operations are also realized:

in response to that an operating duration of the compressor reaches a fourth preset duration, executing the acquiring the ambient temperature around the air conditioner and the first pipe temperature of the exhaust pipe of the compressor.

Further, when the cold storage program is executed by the processor, the following operations are also realized:

acquiring a cold storage temperature in a cold storage box of the air conditioner, and determining whether the cold storage temperature reaches a third preset temperature;

in response to that the cold storage temperature reaches the third preset temperature, turning off the compressor;

in response to that a duration since the compressor is turned off reaches a fifth preset duration, turning off the cooling fan.

Further, when the cold storage program is executed by the processor, the following operations are also realized:

in response to that a duration since the opening degree of the throttle device is adjusted to be the target opening degree reaches a sixth preset duration, repeating the acquiring the ambient temperature around the air conditioner and the first pipe temperature of the exhaust pipe of the compressor.

It should be noted that, in this article, the terms "including," "comprising" or any other variation thereof are intended to encompass non-exclusive inclusion, so that a process, method, article or system that includes a set of elements includes not only those elements but also other elements that are not explicitly listed or that are inherent to such a process, method, article or system. Without further restrictions, the element defined by the sentence "including a . . . " does not exclude that there are other identical elements in the process, method, article or system including this element.

The above serial numbers of the embodiments of the present application are for description only and do not represent the advantages and disadvantages of the embodiments.

From the description of the above embodiments, it is clear to those skilled in the art that the method of the above embodiments can be realized by means of software plus necessary general hardware platform, or by hardware, of course in many cases, the former is preferred. Based on this understanding, the technical solution of the present application can be embodied in the form of a software product, which is stored in a storage medium (such as a ROM/RAM, a magnetic disk or an optical disk) as described above and includes several instructions to make a terminal device (such as a mobile phone, a computer, a server, an air conditioner or a network device, or the like) execute the methods described in various embodiments of the present application.

The above are only preferred embodiments of the present application, and are not therefore limiting the scope of the present application. Any equivalent structure or equivalent process transformation made by using the contents of the specification and drawings of the present application, or any direct/indirect application in other related technical fields is included in the claimed scope of the present application.

What is claimed is:

1. A method for controlling cold storage of an air conditioner comprising:
acquiring an ambient temperature around the air conditioner and a pipe temperature of an exhaust pipe of a compressor of the air conditioner;
acquiring a target opening degree Corresponding to a current cold storage mode of the air conditioner according to the ambient temperature and the pipe temperature;
adjusting an opening degree of a throttle device of the air conditioner to be the target opening degree, the throttle device being arranged at a pipe between a cold storage box of the air conditioner and a condenser of the air conditioner; and
before acquiring the ambient temperature and the pipe temperature:
in response to detecting a cold storage instruction, starting a cooling fan of the air conditioner; and
in response to determining that the cooling fan has been operating for a preset duration, starting the compressor.

2. The method according to claim 1, wherein acquiring the target opening degree includes:
detecting that a target temperature range matching the ambient temperature exists in preset temperature ranges of a preset temperature range set; and
acquiring the target opening degree according to the target temperature range and the pipe temperature.

3. The method according to claim 2, wherein acquiring the target opening degree according to the target temperature range and the pipe temperature includes:
detecting that a target pipe temperature matching the pipe temperature exists among a plurality of preset pipe temperatures corresponding to the target temperature range; and
acquiring the target opening degree according to the target pipe temperature.

4. The method according to claim 2, wherein:
the pipe temperature is a first pipe temperature of the exhaust pipe; and
acquiring the target opening degree according to the target temperature range and the pipe temperature includes:
in response to determining that a target pipe temperature corresponding to the first pipe temperature does not exist among a plurality of preset pipe temperatures corresponding to the target temperature range and a duration since the first pipe temperature is acquired reaches a preset duration, acquiring a second pipe temperature of the exhaust pipe; and
acquiring the target opening degree according to the first pipe temperature, the second pipe temperature, and the plurality of preset pipe temperatures.

5. The method according to claim 4, wherein:
the target pipe temperature is a first target pipe temperature; and
acquiring the target opening degree according to the first pipe temperature, the second pipe temperature, and the plurality of preset pipe temperatures includes:
in response to determining that the second pipe temperature is greater than the first pipe temperature, acquiring one or more preset temperatures higher than the first pipe temperature among the plurality of preset pipe temperatures;
acquiring a second target pipe temperature that is lowest among the one or more preset temperatures; and
acquiring the target opening degree according to the second target pipe temperature.

6. The method according to claim 4, wherein:
the target pipe temperature is a first target pipe temperature; and
acquiring the target opening degree according to the first pipe temperature, the second pipe temperature, and the plurality of preset pipe temperatures includes:
in response to determining that the second pipe temperature is lower than the first pipe temperature, acquiring one or more preset temperatures lower than the first pipe temperature among the plurality of preset pipe temperatures;
acquiring a second target pipe temperature that is highest among the one or more preset temperatures; and
acquiring the target opening degree according to the second target pipe temperature.

7. The method according to claim 1, wherein:
the compressor is a constant frequency compressor; and
starting the compressor includes controlling the compressor to operate according to a preset frequency.

8. The method according to claim 1, wherein:
the compressor is a variable frequency compressor;
the preset duration is a first preset duration; and
starting the compressor includes:
controlling the compressor to operate according to a low frequency; and
in response to that a duration of the compressor operating at the low frequency reaches a second preset duration, adjusting an operating frequency of the compressor according to a preset frequency greater than the low frequency.

9. The method according to claim 8, wherein adjusting the operating frequency of the compressor according to the preset frequency includes:
increasing the operating frequency of the compressor to reach the preset frequency according to a preset time interval and a preset step size.

10. The method according to claim 1, wherein:
the preset duration is a first preset duration; and
acquiring the ambient temperature and the pipe temperature includes:
acquiring the ambient temperature and the pipe temperature in response to determining that an operating duration of the compressor reaches a second preset duration.

11. The method according to claim 1, further comprising, after adjusting the opening degree of the throttle device to be the target opening degree:
acquiring a cold storage temperature in the cold storage box, determining that the cold storage temperature reaches a preset temperature, and turning tuning off the compressor; and in response to determining that a duration since the compressor is turned off reaches a preset duration, turning off a cooling fan of the air conditioner.

12. The method according to claim 1, further comprising, after adjusting the opening degree of the throttle device to be the target opening degree:
in response to determining that a duration since the opening degree of the throttle device is adjusted to be the target opening degree reaches a preset duration, acquiring again the ambient temperature and the pipe temperature.

13. A device for controlling cold storage of an air conditioner comprising:
a memory storing computer-readable instructions; and
a processor configured to execute the computer-readable instructions to:
acquire an ambient temperature around the air conditioner and a pipe temperature of an exhaust pipe of a compressor of the air conditioner;
acquire a target opening degree Corresponding to a current cold storage mode of the air conditioner according to the ambient temperature and the pipe temperature;
adjust an opening degree of a throttle device of the air conditioner to be the target opening degree, the throttle device being arranged at a pipe between a cold storage box of the air conditioner and a condenser of the air conditioner; and
before acquiring the ambient temperature and the pipe temperature:
in response to detecting a cold storage instruction, start a cooling fan of the air conditioner; and
in response to determining that the cooling fan has been operating for a preset duration, start the compressor.

14. The device according to claim 13, wherein the processor is further configured to execute the computer-readable instructions to:
detect that a target temperature range matching the ambient temperature exists in preset temperature ranges of a preset temperature range set; and
acquire the target opening degree according to the target temperature range and the pipe temperature.

15. The device according to claim 14, wherein the processor is further configured to execute the computer-readable instructions to:
detect that a target pipe temperature matching the pipe temperature exists among a plurality of preset pipe temperatures corresponding to the target temperature range; and
acquire the target opening degree according to the target pipe temperature.

16. The device according to claim 14, wherein:
the pipe temperature is a first pipe temperature of the exhaust pipe; and
the processor is further configured to execute the computer-readable instructions to:
in response to determining that a target pipe temperature corresponding to the first pipe temperature does not exist among a plurality of preset pipe temperatures corresponding to the target temperature range and a duration since the first pipe temperature is acquired reaches a preset duration, acquire a second pipe temperature of the exhaust pipe; and
acquire the target opening degree according to the first pipe temperature, the second pipe temperature, and the plurality of preset pipe temperatures.

17. The device according to claim 16, wherein:
the target pipe temperature is a first target pipe temperature; and
the processor is further configured to execute the computer-readable instructions to:
in response to determining that the second pipe temperature is greater than the first pipe temperature, acquire one or more preset temperatures higher than the first pipe temperature among the plurality of preset pipe temperatures;
acquire a second target pipe temperature that is lowest among the one or more preset temperatures; and
acquire the target opening degree according to the second target pipe temperature.

18. The device according to claim 16, wherein:
the target pipe temperature is a first target pipe temperature; and
the processor is further configured to execute the computer-readable instructions to:
in response to determining that the second pipe temperature is lower than the first pipe temperature, acquire one or more preset temperatures lower than the first pipe temperature among the plurality of preset pipe temperatures;
acquire a second target pipe temperature that is highest among the one or more preset temperatures; and
acquire the target opening degree according to the second target pipe temperature.

19. A non-transitory computer-readable storage medium storing computer-readable instructions that, when executed by a processor, cause the processor to:
acquire an ambient temperature around the air conditioner and a pipe temperature of an exhaust pipe of a compressor of the air conditioner;
acquire a target opening degree Corresponding to a current cold storage mode of the air conditioner according to the ambient temperature and the pipe temperature;
adjust an opening degree of a throttle device of the air conditioner to be the target opening degree, the throttle device being arranged at a pipe between a cold storage box of the air conditioner and a condenser of the air conditioner; and
before acquiring the ambient temperature and the pipe temperature:
in response to detecting a cold storage instruction, start a cooling fan of the air conditioner; and
in response to determining that the cooling fan has been operating for a preset duration, start the compressor.

* * * * *